United States Patent [19]

Nixon et al.

[11] 4,094,659
[45] June 13, 1978

[54] PROCESSING OF GLASS SHEETS

[75] Inventors: Phillip Sydney Nixon, Skelmersdale; Harold Woods, Prescot, both of England

[73] Assignee: Triplex Safety Glass Company Limited, Birmingham, England

[21] Appl. No.: 777,837

[22] Filed: Mar. 15, 1977

[30] Foreign Application Priority Data

Mar. 17, 1976 United Kingdom ............... 10682/76

[51] Int. Cl.² ............................................. C03B 35/00
[52] U.S. Cl. ........................................ 65/104; 65/106; 65/114; 65/273; 65/275
[58] Field of Search .................. 65/104, 106, 273, 275, 65/114

[56] References Cited

U.S. PATENT DOCUMENTS 2,370,381   2/1945   Vaughan ............................ 65/273 X Primary Examiner—Arthur D. Kellogg
Attorney, Agent, or Firm—Burns, Doane, Swecker & Mathis

[57] ABSTRACT

A succession of glass sheets are processed, for example by heating, bending and toughening in the production of windshield glasses. Each glass sheet is suspended vertically in an elongated furnace from a transport member, and when hot is lifted from the furnace into the lowermost of a vertical series of treatment stations, for example a bending station followed by a toughening station, by a lifting device which engages the transport member. Subsequently the transport member is supported independently of the lifting device at a level above the furnace so that the lifting device can then be lowered to lift the next glass sheet from the furnace.

14 Claims, 8 Drawing Figures

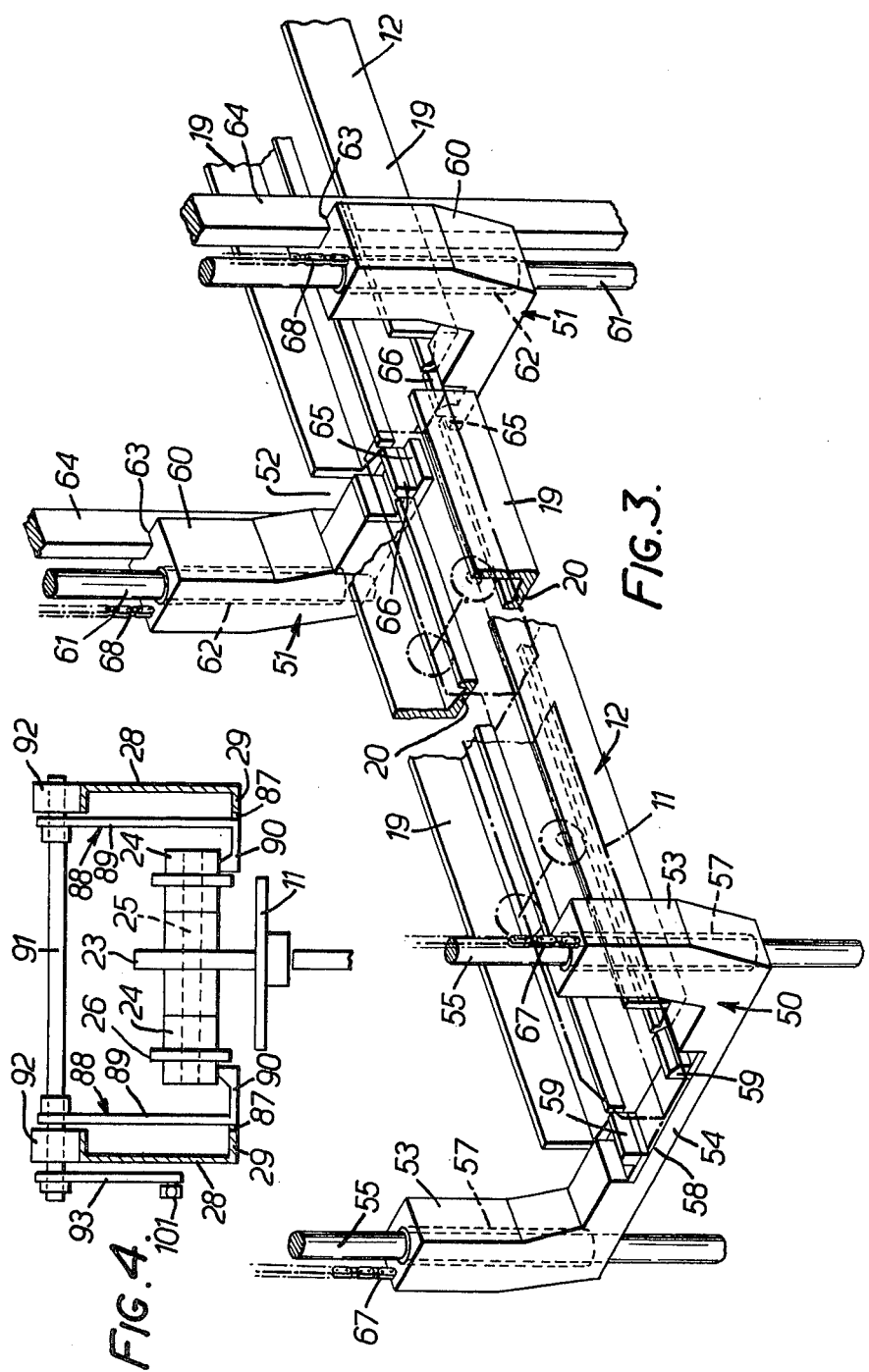

PROCESSING OF GLASS SHEETS

BACKGROUND OF THE INVENTION

1. Field of the Invention

This invention relates to apparatus for the processing of glass sheets, of the type in which a vertically suspended glass sheet is introduced into a furnace and after having attained a temperature suitable for further treatment is raised vertically from the furnace through a series of treatment stations positioned one above the other over the furnace.

2. Description of the Prior Art

A known apparatus of this type includes a furnace which can accomodate a series of glass sheets arranged end to end, the cold glass sheets being introduced vertically at one end of the furnace and the hot glass sheets being removed vertically from the other end of the furnace. A bending station is positioned immediately above this latter end of the furnace and a hot glass sheet is raised vertically from the furnace into the bending station. In the bending station the glass sheet is bent by closure together of horizontally acting bending dies. A quenching station is positioned immediately above the bending station and after opening of the bending dies the bent glass sheet is then raised from the bending station into the quenching station. The glass sheet is toughened in the quenching station for example by directing streams of cooling gas, particularly air, at both surfaces of the glass sheet. The toughened glass sheet is then removed from the quenching station.

In this known form of apparatus the glass sheets are suspended from transport members such as carriages for conveyance through the furnace and through the bending and quenching stations. A single lifting device is provided for lifting the suspended glass from the furnace into the bending station and then into the quenching station. The lifting device is arranged to pick up the carriages for the glass sheets from above so that lowering of the lifting device to pick up the next glass sheet from the furnace is delayed until the preceding glass sheet has been removed from the quenching station. This delay in lowering of the lifting device to pick up the next glass sheet results in an undesirable lengthening of the processing cycle for each glass sheet.

The present invention provides an improvement in such apparatus and an improved method for processing glass sheets.

SUMMARY

The invention provides apparatus for the processing of glass sheets which comprises a furnace for heating a glass sheet whilst the glass sheet is suspended vertically in the furnace from a transport member, and a series of treatmnet stations for the heated glass sheet positioned vertically one above the other over the furnace. A lifting device engages from below with the transport member from which the glass sheet is suspended and lifts a hot glass sheet and the transport member vertically from the furnace at least into the lowermost of the treatment stations. Subsequently the transport member and the suspended glass sheet are supported independently of the lifting device at a level above the furnace, so that the lifting device can then be lowered to lift a further glass sheet from the furnace for the commencement of the processing of such further glass sheet while subsequent processing of the preceding glass sheet is carried out.

In one embodiment of the invention for the production of curved and toughened glass sheets, the treatment stations comprise a bending station including cooperating horizontally acting bending dies immediately above the furnace, and a quenching station including opposed air blowing frames located above the bending station.

Preferably the furnace is of elongated form and includes a horizontal trackway on which the transport members run as they convey the glass sheets horizontally through the furnace from a loading end to a position beneath the treatment stations, a conveyor trackway extends from the uppermost of the treatment stations to a furnace loading hoist positioned above the loading end of the furnace, and the conveyor trackway includes means for moving each transport member in turn from the uppermost of the treatment stations to a position on the conveyor where a processed sheet can be unloaded from the transport member and a sheet to be processed can be loaded on to a transport member and for moving each loaded transport member to the hoist for lowering to load into the furnace the sheet suspended thereform.

In the preferred embodiments each transport member may comprise a wheeled carriage which runs on said trackways, and tongs for gripping a glass sheet suspended from the carriage.

The lifting device may comprise spaced lifting members which, when lowered, are accomodated at the end of the horizontal trackway of the furnace and in gaps in that trackway, which lifting members are arranged to engage from below with a transport member and raise the transport member from that trackway.

In one embodiment the lifting device extends upwardly from the furnace to the conveyor trackway so as to lift a transport member from the furnace through all the treatment stations, and the conveyor trackway includes said means for subsequently supporting the transport member so that the lifting device can be lowered to pick up a further transport member and glass sheet from the furnace.

In a second embodiment the lifting device is arranged to raise a transport member and the suspended glass sheet from the furnace up to an intermediate treatment station, and said means for subsequently supporting the transport member and the suspended glass sheet is a second lifting device which is arranged to pick up the transport member and the suspended glass sheet at the intermediate treatment station and to raise the glass sheet through the remaining treatment stations to the conveyor trackway, while the first mentioned lifting device is lowered to pick up a further transport member and glass sheet from the furnace.

In this second embodiment the lifting device may be arranged to raise the transport member and the suspended glass sheet to the lowermost of the treatment stations, and the second lifting device is arranged to pick up the transport member and the suspended glass sheet at the lowermost of the treatment stations.

The invention also comprehends a method for the processing of a glass sheet, comprising the steps of suspending a glass sheet from a transport member in a furnace, heating the glass sheet in the furnace to a temperature suitable for further processing, lifting the transport member with the suspended glass sheet vertically from the furnace through a series of transport stations positioned vertically one above the other, the transport member with the suspended glass sheet being raised from below at least into the lowermost of said treatment stations, subsequently independently supporting the transport member and the suspended glass sheet at a level above the furnace, lifting a further glass sheet from the furnace by lifting a transport member from which said further glass sheet is suspended, and commencing processing of said further glass sheet at the lowermost of said treatment stations while subsequent processing of the preceding glass sheet is carried out at the higher treatment stations.

BRIEF DESCRIPTION OF THE DRAWINGS

Some embodiments of the invention will now be described, by way of example with reference to the drawings in which:

FIG. 3 is a detail in isometric form of part of the apparatus of FIGS. 1 and 2, FIG. 4 is a cross-section on the line IV—IV in FIG. 1a, and FIGS. 5a and 5b together form an isometric elevation of part of a second embodiment of apparatus according to the invention for heating, bending and toughening glass sheets.

DESCRIPTION OF THE PREFERRED EMBODIMENTS

Figure 1A:
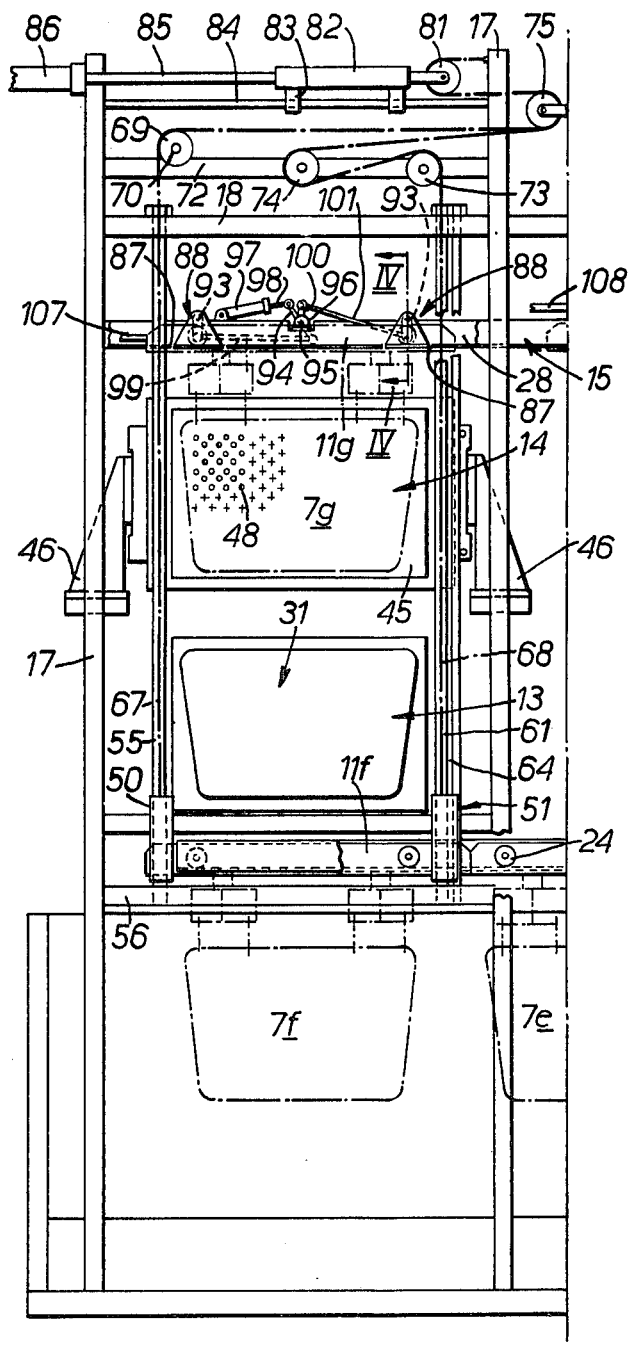
FIGS. 1a, 1b and 1c together form a longitudinal part-sectional elevation of one embodiment of apparatus according to the invention for heating, bending and toughening glass sheets.
Figure 1B:
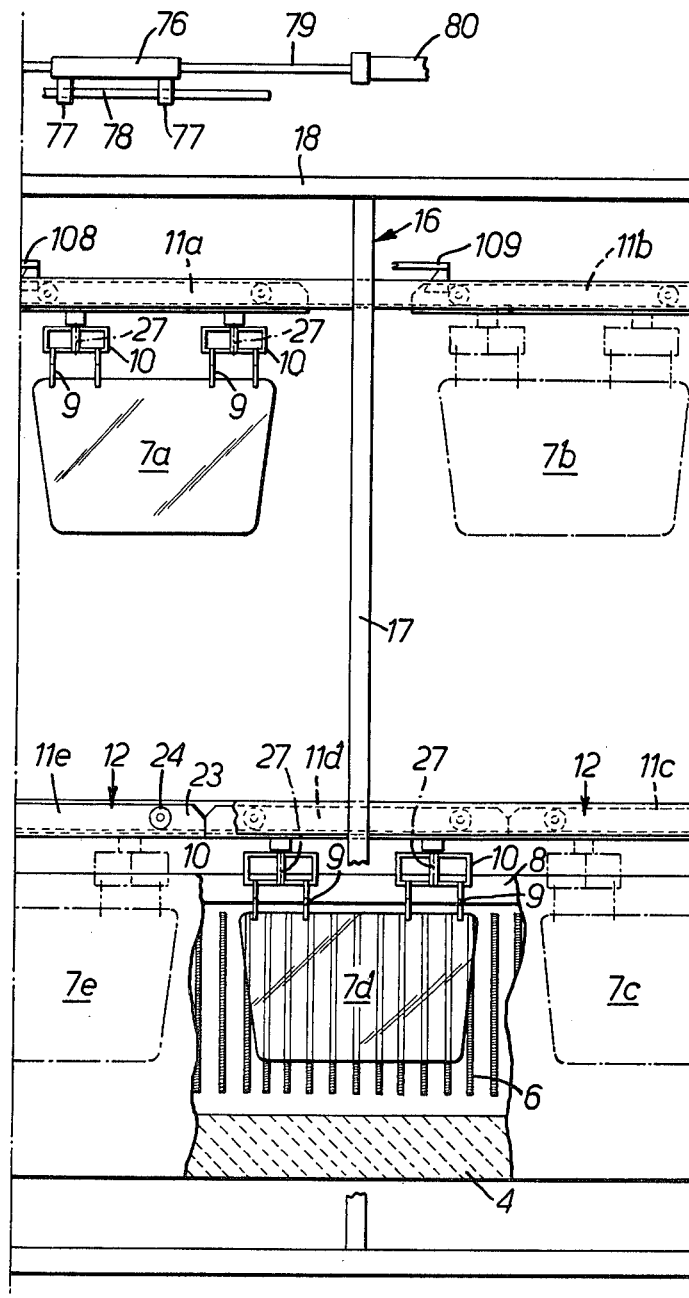

FIGS. 1a, 1b and 1c and FIG. 2 of the drawings illustrate apparatus according to the invention for the heating, bending and toughening of glass sheets to be used as single sheet windscreens for vehicles of in the manufacture of laminated windscreens. Glass sheets are conveyed through the apparatus while suspended in a vertical disposition. Typically the glass sheets may be up to 220 centimeters in length by 130 centimeters in depth.

A furnace chamber is indicated at 1 and is of rectangular form in cross-section. The furnace chamber 1 of elongated form is a refractory lined metal structure having two side walls 2 and 3, a floor 4 and a roof 5. Electrically energised heating elements 6 are mounted on the facing side walls 2 and 3 of the furnace 1. The furnace 1 is of sufficient length to accommodate a series of glass sheets 7. A longitudinal slot 8 in the roof 5 of the furnace 1 provides access for suspension of the glass sheets 7 vertically in the furnace 1 by means of self-closing tongs 9. The tongs 9 are suspended by pivoted gates 10 from transport members which are wheeled carriages 11 which run along a lower trackway 12 extending longitudinally above the slot 8 in the roof 5 of the furnace 1 so that the glass sheets are moved horizontally in sequence through the furnace by means of the transport members.

A series of treatment stations for the heated glass sheets are positioned one above the other over the left hand end of the furnace 1.

The first of these is a bending station 13, and a quenching station 14 is a second treatment station provided above the bending station 13. A conveyor in the form of an upper longitudinal trackway 15 corresponding to the lower trackway 12 is provided at a position above the level of the quenching station 14.

A main framework 16 for supporting the lower trackway 12, the upper trackway 15 and the components of the bending station 13 and the quenching station 14, includes vertical girders 17 which are connected together at their upper ends by longitudinal girders 18.

Figure 2:
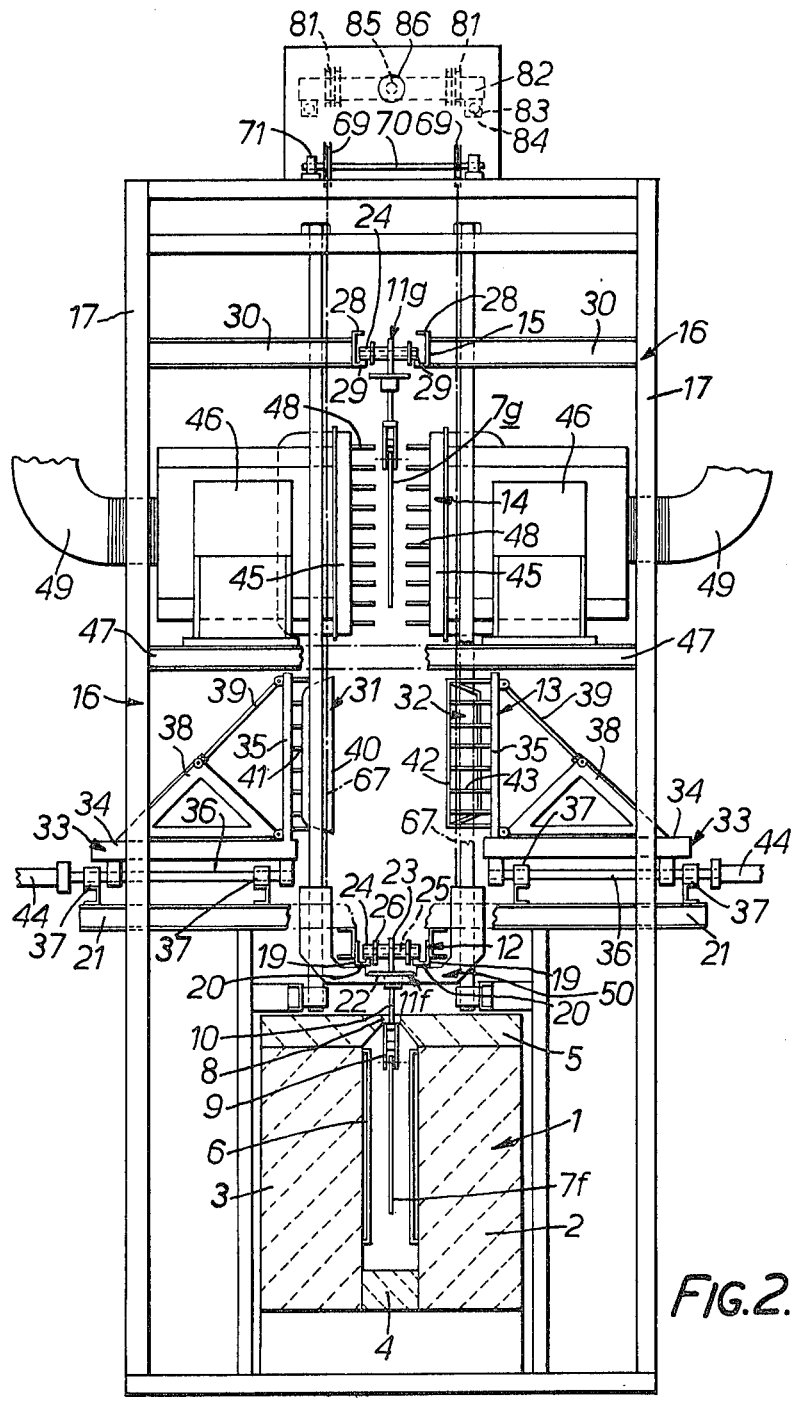
FIG. 2 is an end elevation, partly in section, of the apparatus of FIG. 1.

In detail, shown in FIG. 2, the lower trackway 12 comprises two parallel rails 19 having inwardly extending side flanges 20. The rails 19 are mounted from support girders 21 which extend between the vertical girders 17 of the main framework 16. The carriages 11 of the transport members are of T cross-section comprising a bottom plate member 22 and a vertical web 23. Each carriage 11 is fitted with two pairs of wheels 24 which are mounted at the ends of transverse shafts 25 carried by the vertical web 23 of the carriage 11. The wheels 24 of the carriages 11 run on the inwardly extending flanges 20 of the rails 19 which form the lower trackway 12. The wheels 24 have side flanges 26 which provide for sideways location of the carriages 11 on the trackway 12.

Each glass sheet 7 is suspended in the furnace 1 by two or more of the tongs 9; typically four of the tongs 9 are used. Each tong 9 is suspended from a gate member 10 and the gate members 10 are pivoted in pairs from shafts 27, FIG. 1b, which extend downwardly from the bottom plate members 22 of the carriages 11.

The upper trackway 15 is of similar form the to lower trackway 12 and comprises two parallel rails 28, FIG. 2, having inwardly extending flanges 29. The rails 28 are mounted on cross girders 30 which form part of the main support framework 16.

The bending station 13 includes a male die 31 and a female die 32. The male die 31 is mounted on a die actuator 33 which comprises a base frame 34 and an upright die support frame 35 which is pivoted at its lower end on the base frame 34. The base frame 34 of the die actuator 33 is fitted with two parallel support shafts 36 which run in bearing bushes 37 which are mounted on the support girders 21 for the end of the lower trackway 12 which extends below the bending station 13. A pair of triangular backing frames 38 are mounted on the base frame 34 of the die actuator 33. Each frame 38 is connected at its apex with the die support frame 35 by an adjustor rod 39 which can be adjusted in length so as to adjust the angle of tilt of the die support frame 35 with respect to the base frame 34 of the die actuator 38.

The male die 31 has a continuous sheet metal skin 40 and is mounted from the die support frame 35 of the die actuator 33 by adjuster rods 41.

The female die 32 is mounted on a similar die actuator 33 and comprises a rim member 42 which is mounted from the die support frame 35 of the female die actuator 33 by adjuster rods 43. The male and female die actuators 33 are each fitted with a hydraulic cylinder 44 for moving the die actuators 33 inwardly towards each other in order to bend a glass sheet between the dies. The hydraulic cylinders 44 also provide for retraction of the die actuators 33 after bending of a glass sheet.

The quenching station 14 includes two opposed blowing boxes 45 which are mounted by brackets 46 from cross girders 47 forming part of the main support framework 16. Blowing nozzles 48 are plugged into the opposed faces of the blowing boxes 45 which are fitted with air inlet pipes 49 connected to an air supply. The blowing boxes 45 are mounted to be moved inwardly from a retracted position to a position appropriate for toughening of a hot bent glass sheet when located between the blowing boxes 45. As is conventional the blowing boxes 45 are also mounted so that they can be oscillated both in the horizontal and vertical directions relative to the glass sheet whilst air from the blowing nozzles 48 is directed at both surfaces of the glass sheet.

A lifting device for lifting a heated glass sheet 7 and the carriage 11 from which it is suspended vertically from the furnace 1 into the bending station 13 and then into the quenching station 14 comprises, as shown in FIG. 3, a single lifting member 50 which is located adjacent the end of the lower trackway 12 and two associated lifting fingers 51 which are housed in gaps 52 in the parallel rails 19 which form the lower trackway 12. The lifting device also includes hoist means for raising and lowering the lifting member 50 and the lifting fingers 51 as is described below. The lifting member 50 has two main blocks 53 which are joined at their lower ends by a bridge piece 54. The main blocks 53 of the lifting member 50 run on vertical shafts 55 which extend upwards from bottom support girders 56, FIG. 1a, forming part of the main framework 16 and which are located at their upper ends by the upper longitudinal girders 18 of the main framework 16. The main blocks 53 of the lifting member 50 are fitted with sleeve bearings 57 of the recirculating ball type which run on the vertical shafts 55. The bridge piece 54 of the lifting member 50 has a recess 58 in its upper face to engage from below with the end of the carriage 11 which projects beyond the end of the lower trackway 12. The recess 58 in the bridge piece 54 is fitted with side bars 59 which locate the end of the carriage 11 against sideways movement in the recess 58.

The individual lifting fingers 51 each extend from a main block 60 which runs on a vertical shaft 61. The main block 60 of each lifting finger 51 is fitted with a sleeve bearing 62 also of the recirculating ball type which runs on the vertical shaft 61, and has a vertical guide slot 63 which engages with a guide bar 64 of rectangular cross-section and which extends parallel to the vertical shaft 61. This arrangement prevents the individual lifting fingers 51 from swivelling on the shafts 61.

The vertical shafts 61 and the guide bars 64 extend upwards from the bottom support girders 56 of the main framework 16 and are located at their upper ends by the upper longitudinal girders 18 of the main framework 16.

Each of the lifting fingers 51 has a recess 65 at its outer end which engages from below beneath the end of the carriage 11 when the lifting fingers 51 are in the position shown in FIG. 3. The recess 65 in each lifting finger 51 is fitted with a side bar 66 and the side bars 66 prevent sideways movement of the end of the carriage 11 between the lifting fingers 51. The side bars 66 also bridge the gaps in the lower trackway 12 at the lowered position of the lifting fingers 51 as shown in FIG. 3.

Two lifting chains 67 are attached to the lifting member 50 and individual lifting chains 68 are attached to each of the lifting fingers 51. The two lifting chains 67 for the lifting member 50 run around sprocket wheels 69, FIGS. 1a and 2, which are mounted on a shaft 70 which is carried by bearing blocks 71 from an upper longitudinal girder 72 of the main framework 16. The individual lifting chains 68 for the lifting fingers 51 run around sprocket wheels 73 which are also mounted on the upper longitudinal girders 72 of the main framework 16. The lifting chains 68 then run around two further sprocket wheels 74 on the upper longitudinal girder 72. The two lifting chains 67 and the individual lifting chains 68 each then run around one of four sprocket wheels 75 which are mounted on a sliding frame 76, FIG. 1b.

The sliding frame 76 is carried by bearing bushes 77 which run on horizontal shafts 78. The operating shaft 79 of a first fixed hydraulic cylinder 80 is connected to the sliding frame 76.

The two lifting chains 67 and the two individual lifting chains 68 then pass around four further sprocket wheels 81 which are mounted on a sliding frame 82 and the ends of the chains 67 and 68 are attached to one of the vertical girders 17 of the main framework. The sliding frame 82 is carried by bearing bushes 83 which run on horizontal shafts 84. The operating shaft 85 of a second fixed hydraulic cylinder 86 is connected with the sliding frame 82.

By operation of the first hydraulic cylinder 80, the carriage 11 with the suspended glass sheet 7 can be raised from the furnace position to bring the glass sheet into position between the bending dies 31 and 32. Operation of the second hydraulic cylinder 86 then raises the carriage 11 to an upper position to bring the glass sheet into position between the blowing boxes 45. When in this upper position the carriage 11 is in alignment with the upper trackway 15.

The rails 28 forming the upper trackway 15 are spaced sufficiently far apart to permit the body of the carriage 11 to pass between the inwardly extending flanges 29 of the rails 28. However there is insufficient space between the rails 28 of the upper trackway 15 to permit passage of the carriage wheels 24. Therefore as shown in FIG. 4, gaps 87 are provided in the inwardly extending flanges 29 of the rails 28 which form the upper trackway 15 at positions which will permit the wheels 24 of the carriage 11 to pass through the gaps 87.

Swinging rails 88 are provided for closing the gaps 87. Each swinging rail 88 is in the form of a quadrant-shaped plate 89 having a side flange 90 corresponding in shape to the gaps 87 in the flanges 29 of the rails 28. The swinging rails 88 are arranged in pairs relating to the corresponding gaps 87 in the flanges 29 of the two rails 28 which form the upper trackway 15. The swinging rails 88 of each pair are mounted on a common shaft 91 which is carried by bearing brackets 92 from the upper faces of the rails 28. An operating lever 93 is fixed to the outer end of the shaft 91 which carries each pair of the swinging rails 88.

A main actuating lever 94, FIG. 1a, is centrally mounted on a shaft 95 which is carried by a bearing bracket 96 from one of the rails 28. An hydraulic cylinder 97 which is pivoted at its rear end on the rail 28 has it operating shaft 98 connected by a pivot with one end of the main actuating lever 94. A link rod 99 connects the other end of the main actuating lever 94 with the operating lever 93 for one of the pairs of swinging rails 88. A secondary lever 100 is mounted on the shaft 95 and a link rod 101 connects the end of the secondary lever 100 with the operating lever 93 for the other pair of swinging rails 88.

In the position shown in FIG. 4 the side flanges 90 of the swinging rails 88 close the gaps 87 in the flanges 29 of the rails 28 which form the upper trackway 15 and form an extension of the flanges 29 in the gaps 87 to support the carriage 11 at its wheels 24 thereby supporting the carriage 11 and its suspended glass sheet independently of the lifting device at a level above the furnace. By operation of the hydraulic cylinder 97 the pairs of swinging rails 88 can be swung from this position to a position in which the gaps 87 in the flanges 29 of the rails 28 are open. The wheels 24 of a carriage 11 can then pass through the gaps 87 in the flanges 29 of the rails 28 as the carriage 11 is raised between the rails 28 of the upper trackway 15.

Figure 1C:
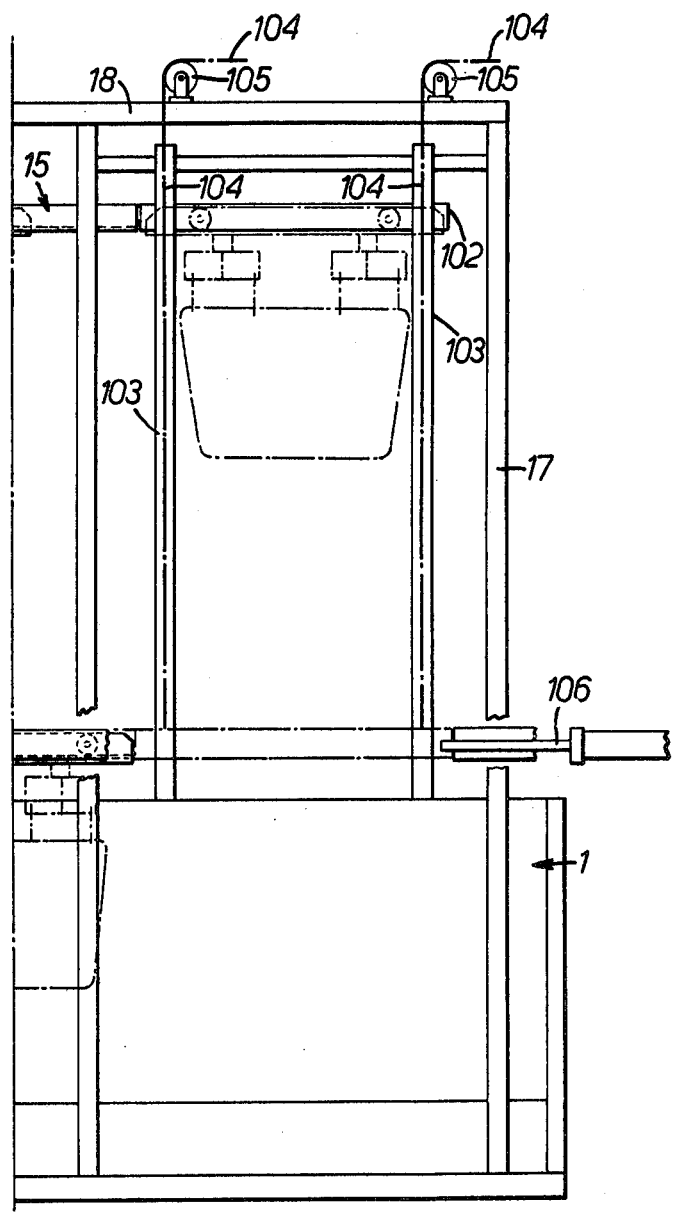

As shown in FIG. 1c, a furnace loading hoist is positioned above the loading end of the furnace which is at the opposite end of the apparatus to the bending and tempering stations 13 and 14.

The furnace loading hoist comprises two parallel rails 102 of cross-section matching that of the rails 19 which form the lower trackway 12 and to the rails 28 which form the upper trackway 15. The two parallel rails 102 can be raised or lowered as a composite unit on vertical guide members 103 by means of lifting chains 104 which run around sprocket wheels 105 carried by the upper longitudinal girders 18 of the main framework 16. The unit of the two parallel rails 102 when in a raised position forms an extension of the upper trackway 15 and when in a lowered position forms an extension of the lower trackway 12.

A single hydraulically operated pusher member 106, FIG. 1c, is provided for pushing a train of carriages 11 along the lower trackway 12 to move the glass sheets 7 which are suspended from the carriages 11 through the furnace 1. Pusher members 107, 108 and 109, operated by a common hydraulic cylinder, not shown, are provided for moving the carriages 11 along the upper trackway 15.

At the stage of operation of the apparatus as shown in FIGS. 1, 1a, 1b and 1c, the furnace loading hoist is in its fully raised position in alignment with the upper trackway 15. The lifting member 50 and the lifting fingers 51 of the lifting device are in their fully lowered positions in alignment with the part of lower trackway 12 below the bending station 13.

Two previously loaded glass sheets 7a and 7b, awaiting processing, are suspended from carriages 11a and 11b on the upper trackway 15. Four glass sheets 7c, 7d, 7e and 7f are suspended in the furnace 1 from carriages 11c, 11d, 11e and 11f on the lower trackway 12. In passing through the furnace the glass sheets are heated to a processing temperature for example 680° C. The leading carriage 11f from which the glass sheet 7f is suspended in the furnace is in a position to be picked up and raised by the lifting device.

A glass sheet 7g is suspended between the blowing boxes 45 in the quenching station 14 from a carriage 11g on the part of the upper trackway 15 above the quenching station 14. Quenching of the glass sheet 7g has just been completed.

The next stage of operation of the apparatus is to raise the lifting member 50 and the lifting fingers 51 of the lifting device by operation of the hydraulic cylinder 80 thus lifting the carriage 11f with the suspended glass sheet 7f to bring the glass sheet 7f into position between the open bending dies 31 and 32. The dies 31 and 32 are then closed to bend the glass sheet 7f by operation of the die actuator cylinders 44 following which the dies 31 and 32 are re-opened.

At the same time as the glass sheet 7f is being raised into the bending station 13 and is being bent between the dies 31 and 32, the carriage 11b with the suspended glass sheet 7b is pushed along the upper trackway 15 onto the furnace loading hoist by means of the pusher member 109. Simultaneously the carriage 11a with the suspended glass sheet sheet 7a is pushed along the upper trackway 15 by means of the pusher member 108 to move the glass sheet 7a into the position previously occupied by the glass sheet 7b. The carriage 11g with the previously toughened glass sheet 7g is pushed along the upper trackway 15 by the pusher member 107 to move the glass sheet 7g from between the blowing boxes 45 of the quenching station 14 into the position previously occupied by the glass sheet 7a. At this position the glass sheet 7g is unloaded manually from the carriage 11g and a further glass sheet is loaded manually onto the carriage 11g for subsequent processing.

After the glass sheet 7f has been bent and after initial reopening of the bending dies 31 and 32 the lifting device is raised a further amount by operation of the hydraulic cylinder 86 thus lifting the carriage 11f and the suspended glass sheet 7f to bring the glass sheet 7f into position between the blowing boxes 45 of the quenching station 14. Prior to this further lifting of the carriage 11f the swinging rails 88 have been swung upwards by operation of the hydraulic cylinder 97 to open the gaps 87 in the flanges 29 of the rails 28 which form the upper trackway 15. Thus as the carriage 11f is raised the wheels 24 of the carriage can pass through the gaps 87 in the flanges 29 of the rails 28. When the carriage 11f has been fully raised the swinging rails 88 are swung downwards to close the gaps 87 in the flanges 29 of the rails 28 so that the carriage 11f is then supported on the upper trackway 15 independently of the support provided by the lifting member 50 and the lifting fingers 51 of the lifting device.

The lifting member 50 and the lifting fingers 51 are now lowered into re-alignment with the lower trackway 12 whilst toughening of the glass sheet 7f is carried out at the quenching station 14 by feed of air to the blowing boxes 45.

As the glass sheet is being lifted from the bending station 13 into the quenching station 14 the furnace loading hoist is lowered to bring the carriage 11b which carried the glass sheet 7b into alignment with the lower trackway 12 thereby lowering the sheet 7b into the furnace. Subsequent to lowering of the lifting member 50 and the lifting fingers 51 into alignment with the other end of the lower trackway 12 the carriage 11b is pushed off the furnace loading hoist onto the lower trackway 12 by the pusher member 106. The carriage 11b pushes the other carriages 11c, 11d and 11e along the lower trackway 12 so that the leading carriage 11e with the suspended glass sheet 7e is pushed onto the end of the lower trackway 12 below the bending station in which position the carriage 11e can be picked up by lifting member 50 and the lifting fingers of the lifting device. Subsequent processing of the glass sheet 7e is as for the previous glass sheet 7f described above.

The series of glass sheets in the furnace 1 are moved stepwise through the furnace, the sheets being moved one step forward in the processing cycle of each glass sheet. Thus the glass sheets are resident in the furnace for a time sufficient for the sheets to become heated to a temperature suitable for subsequent bending and tempering.

Co-ordinated sequence control of the various means for moving the carriages 11 with the suspended glass sheets through the various processing stages described above is obtained by the use of suitable control means.

Figure 5A:
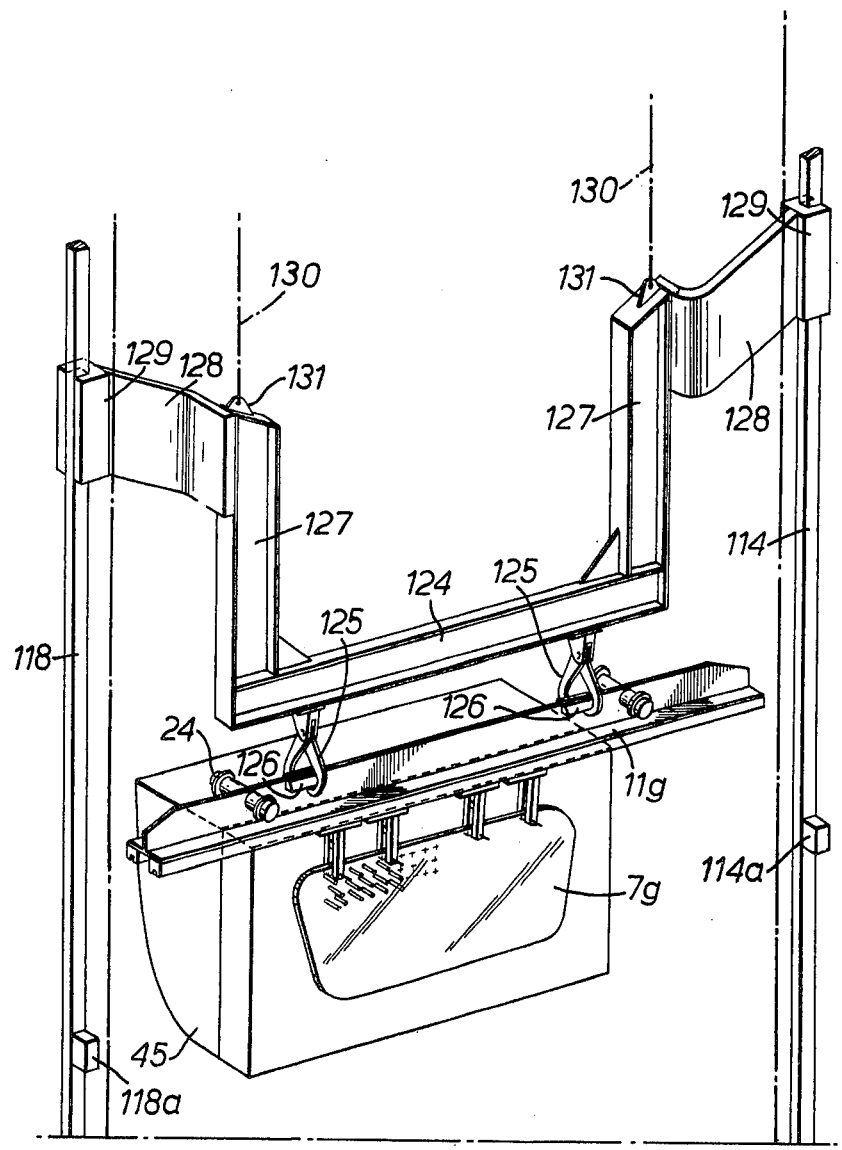
Figure 5B:
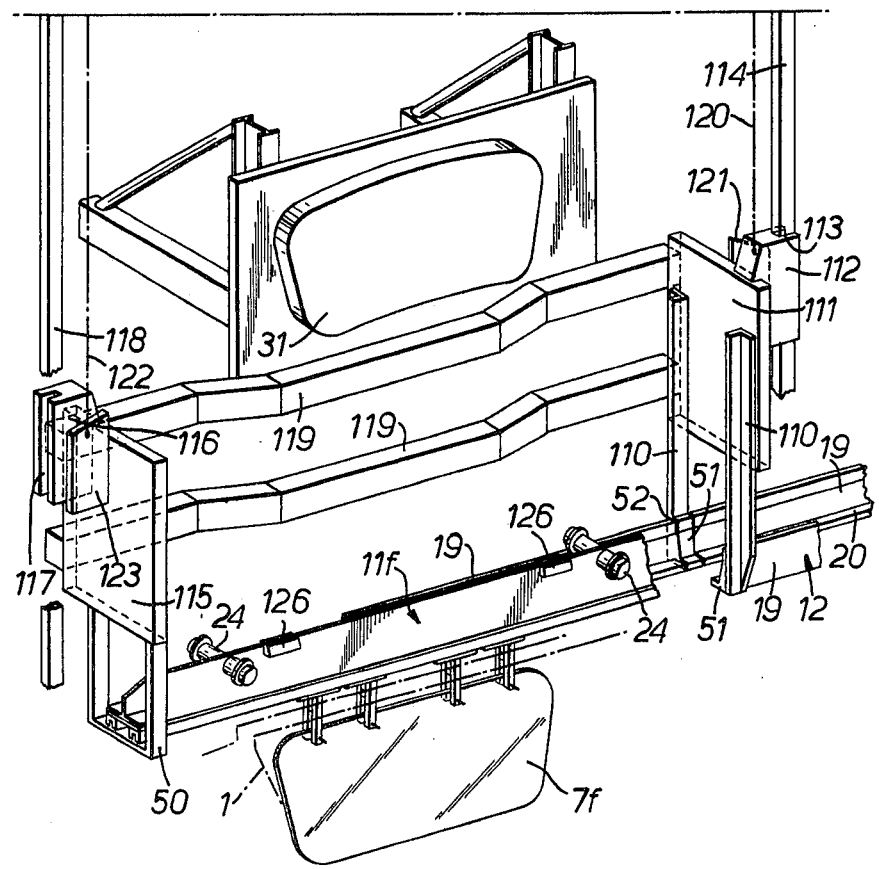

FIG. 5a and 5b together show a form of lifting device alternative to that shown in FIGS. 1 to 4, similar reference numerals being used in FIGS. 5a and 5b for the parts which are similar to parts of the apparatus of FIGS. 1 to 4.

In embodiment of FIG. 5 the lifting device includes a U-shaped lifting member 50 which picks up the end of the carriage 11 projecting beyond the end of the lower trackway 12, and two associated lifting fingers 51 which fit in the gaps 52 in the parallel rails 19 forming the lower trackway 12 and which pick up the other end of the carriage 11.

The lifting fingers 51 are fitted at the lower ends of 5 struts 110 which extend downwards from a plate member 111. A guide block 112 is welded to the plate member 111 and the guide block 112 has a guide slot 113 which engage with a fixed vertical guide bar 114 of rectangular cross-section. Similarly the single lifting member 50 extends downwards from a plate member 115 to which there is welded a guide block 116. The guide block 116 has a guide slot 117 which engages with a second vertical guide bar 118. The plate members 111 and 115 are connected by welded cross members 119. A lifting chain 120 is connected to a lug 121 on the plate member 111 and a lifting chain 122 is connected to a lug 123 on the plate member 115.

Stop members 114a and 118a are provided on the vertical guide bars 114 and 118 respectively in order to limit the movement of the lifting device to an upper position in which the glass sheet is located for bending between the dies 31 and 32.

A second lifting device including an upper lifting beam 124 is provided running on the vertical guide bars 114 and 118 above the lifting member 50 and the lifting fingers 51. The lifting beam 124 is fitted with a pair of tongs 125 which are self engaging with lugs 126 on the carriages 11. Vertical extension pieces 127 are welded to the ends of the lifting beam 124. Plate members 128 welded to the upper ends of the extension pieces 127 are fitted with guide blocks 129 which run on the vertical guide bars 114 and 118. A lifting chain 130 is connected to a lug 131 at the upper end of each extension piece 127 of the lifting beam 124.

In the arrangement of FIGS. 5a and 5b the lifting device is employed to raise a carriage 11f and suspended glass sheet 7f from the furnace up to the position of the bending station 13 where the glass sheet 7f is bent between the bending dies 31 and 32. A preceding glass sheet 7g is suspended from a carriage 11g at the quenching station 14. The carriage 11g is supported on the part of the upper trackway 15 above the quenching station 14 having been previously lifted into this position from the position of the bending station 13 by means of the upper lifting beam 124. Quenching of the glass sheet 7f at the quenching station 14 has been completed prior to commencing the lifting of the glass sheet 7f from the furnace 1.

While the glass sheet 7f is being lifted from the furnace 1 into the bending station 13 the carriage 11g with the suspended glass sheet 7g is pushed along the upper trackway 15 to move the glass sheet 7b clear of the quenching station 14. This clears the upper lifting beam 124 for lowering at the same time as the carriage 11f with the suspended glass sheet 7f are being raised by the under lift mechanism from the furnace 1 up to the position of the bending station 13.

The tongs 125 carried by the upper lifting beam 124 engage with the lugs 126 on the carriage 11f as the bending dies 31 and 32 are opening subsequent to bending of the glass sheet 7f. The carriage 11f and the suspended glass sheet 7f are raised by means of the upper lifting beam 124 to bring the glass sheet 7f between the blowing boxes 45 of the quenching station 14 and at the same time the lifting member 50 and the lifting fingers 51 of the first lifting device are lowered into realignment with the lower trackway 12. While the glass sheet 7f is being toughened at the quenching station 14 the next carriage 11 and suspended glass sheet 7 is moved along the lower trackway 12 into a position below the bending station 13 ready to be raised by the first lifting device at the commencement of the next processing cycle.

Apparatus according to the invention differs from existing apparatus of this type in the provision of the lifting device for raising the leading carriage 11 and the suspended glass sheet 7 at least into position in the bending station 13.

In the known type of apparatus the carriage is picked up by means of self closing tongs on a lifting hoist which operates from above the carriage. The carriage with the suspended glass sheet is lifted by the hoist firstly into the bending station and then into the quenching station. The hoist cannot be lowered to pick up the next carriage and glass sheet from the furnace until the preceding glass sheet has been toughened and has been removed from the quenching station by moving the carriage from which this glass sheet is suspended along the upper trackway. Hence the process cycle is extended by at least the time taken to clear the previously toughened glass sheet from the quenching station and the time taken to lower the hoist to pick up the next carriage and glass sheet from the furnace. A typical process cycle time for the known arrangement is 35 seconds.

In the embodiment of FIGS. 1 to 4 of the drawings, the lifting device can be lowered into realignment with the lower trackway 12 and the next carriage 11 and suspended glass sheet 7 can be pushed onto the end of the lower trackway 12 below the bending station 13 while the proceding glass sheet is being toughened at the quenching station 14. The carriage 11 with the suspended glass sheet 7 can then be raised by the lifting device from the furnace 1 into the bending station 13 and the bending of the glass sheet 7 begun while the preceding previously toughened glass sheet 7 is being removed from the quenching station 14. This rearrangement of the process steps provides a significant reduction in the process cycle time for example from a normal process cycle time 35 seconds as referred to above, to a cycle time of as little as 25 seconds.

In the embodiment of FIGS. 5a and 5b the first lifting device can be lowered from the position of the bending station 13 into realignment with the lower trackway 12 as soon as the carriage 11 with the suspended glass sheet 7 has been picked up by the tongs 125 of the upper lifting beam 124. The carriage 11 with the suspended glass sheet 7 is raised by the lifting beam 124 to bring the glass sheet 7 into the quenching station 14. As the glass sheet 7 reaches the quenching station and toughening of the glass sheet 7 commences the lifting device reaches it lower position when the next carriage 11 and suspended glass sheet 7 can be moved along the lower trackway 12 into position below the bending station 13. After completion of toughening of the preceding glass sheet 7 the lifting device is operated to raise the next carriage 11 and glass sheet 7 from the furnace into the bending station 13 while the preceding glass sheet is being removed from the quenching station 14, so that the upper lifting beam 124 can be lowered once again. It is arranged that the bending of the glass sheet 7 at the bending station has been completed and that the bending dies 34 and 35 are re-opening at the point when the upper lifting beam reaches its lower position to engage the carriage 11 at the bending station 13.

The embodiment of FIG. 5 also results in a significant reduction of the process cycle time as compared with the known arrangement, a reduction from the normal cycle time of 35 seconds down to a cycle time of 27 seconds is typical.

In the particular embodiments described above the processing steps which are carried out on the glass sheets subsequent to heating of the glass sheets in the furnace are the two steps of bending followed by quenching of the glass sheets. The invention is also applicable to other forms of processing which may include more than two processing steps which need not necessarily include bending and quenching steps or which may include other types of processing steps such as spraying of the glass sheets with a coating material.

We claim:

1. Apparatus for the processing of glass sheets comprising a furnace for heating the glass sheets, a plurality of transport members from each of which transport members a glass sheet is suspended vertically in the furnace, a series of treatment stations for the heated glass sheets positioned vertically one above the other over the furnace, a lifting device associated with said treatment stations and including means for engaging below one of said transport members and lifting that transport member and the heated glass sheet suspended therefrom vertically from the furnace at least into the lowermost one of said treatment stations, and means above said lowermost one of the treatment stations for subsequently supporting the transport member and the suspended glass sheet independently of the lifting device, so that the lifting device can then be lowered to engage below the transport member of a further glass sheet suspended in the furnace for the commencement of the lifting of such further glass sheet from the furnace to said lowermost one of the treatment stations while subsequent processing of said glass sheet is carried out.

2. Apparatus according to claim 1, for the production of curved and toughened glass sheets, in which the treatment stations comprise a bending station including cooperating horizontally acting bending dies located immediately above the furnace, and a quenching station including opposed air blowing frames located above the bending station.

3. Apparatus according to claim 1, wherein the furnace is of elongated form and includes a horizontal trackway on which the transport members run as they convey the glass sheets horizontally through the furnace from a loading end to a position beneath the treatment stations, a conveyor trackway extends from the uppermost of the treatment stations to a furnace loading hoist positioned above the loading end of the furnace, and the conveyor trackway includes means for moving each transport member in turn from the uppermost of the treatment stations to a position on the conveyor where a processed sheet can be unloaded from the transport member and a sheet to be processed can be loaded on to a transport member and for moving each loaded transport member to the hoist for lowering to load into the furnace the sheet suspended therefrom.

4. Apparatus according to claim 3, wherein each transport member comprises a wheeled carriage which runs on said trackways, and tongs for gripping a glass sheet suspended from the carriage.

5. Apparatus according to claim 3, wherein the lifting device comprises spaced lifting members which, when lowered, are accomodated at the end of the horizontal trackway of the furnace and in gaps in that trackway, which lifting members are arranged to engage from below with a transport member and raise the transport member from that trackway.

6. Apparatus according to claim 3, wherein the lifting device extends upwardly from the furnace to the conveyor trackway so as to lift a transport member from the furnace through all the treatment stations, and the conveyor trackway includes said means for subsequently supporting the transport member so that the lifting device can be lowered to pick up a further transport member and glass sheet from the furnace.

7. Apparatus according to claim 6, wherein the lifting device comprises spaced lifting members which, when lowered, are accomodated at the end of the horizontal trackway of the furnace and in gaps in that trackway, which lifting members are arranged to engage from below with a transport member and raise the transport member from that trackway.

8. Apparatus for the processing of glass sheets comprising a furnace for heating the glass sheets whilst the glass sheets are suspended vertically in the furnace from transport members, a series of treatment stations for the heated glass sheets positioned vertically one above the other over the furnace, a lifting device for lifting a heated glass sheet and the transport member from which it is suspended vertically from the furnace up to an intermediate station of said treatment stations, said lifting device being such as to engage from below with the transport member from which the glass sheet is suspended, and means for subsequently supporting the transport member and the suspended glass sheet independently of the lifting device at a level above the furnace, so that the lifting device can then be lowered to lift a further glass sheet from the furnace, wherein the furnace is of elongated form and includes a horizontal trackway on which the transport members run as they convey the glass sheets horizontally through the furnace from a loading end to a position beneath the treatment stations, a conveyor trackway extends from the uppermost of the treatment stations to a furnace loading hoist positioned above the loading end of the furnace, the conveyor trackway includes means for moving each transport member in turn from the uppermost of the treatment stations to a position on the conveyor where a processed sheet can be unloaded from the transport member and a sheet to be processed can be loaded on to a transport member and for moving each loaded transport member to the hoist for lowering to load into the furnace the sheet suspended therefrom, and said means for subsequently supporting the transport member and the suspended glass sheet is a second lifting device which is arranged to pick up the transport member and the suspended glass sheet at the intermediate treatment station and to raise the glass sheet through the remaining treatment stations to the conveyor trackway, while the first mentioned lifting device is lowered to pick up a further transport member and glass sheet from the furnace for the commencement of the processing of such further glass sheet while subsequent processing of the preceding glass sheet is carried out.

9. Apparatus according to claim 8, wherein the lifting device comprises spaced lifting members, which when lowered, are accomodated at the end of the horizontal trackway of the furnace and in gaps in that trackway, which lifting members are arranged to engage from below with a transport member and raise the transport member from that trackway.

10. Apparatus according to claim 7, wherein the lifting device is arranged to raise the transport member and the suspended glass sheet to the lowermost of the treatment stations, and a second lifting device is arranged to pick up the transport member and the suspended glass sheet at said lowermost of the treatment stations and to raise the glass sheet to the conveyor trackway, while the first mentioned lifting device is lowered to pick up a further transport member and glass sheet from the furnace.

11. A method for the processing of a glass sheet comprising the steps of suspending a glass sheet from a transport member in a furnace, heating the glass sheet in the furnace to a temperature suitable for further processing, lifting the transport member with the suspended glass sheet from below vertically from the furnace into a lowermost one of a series of treatment stations which are positioned vertically one above the other, subsequently independently supporting the transport member and the suspended glass sheet at said lowermost one of said treatment stations, lifting the transport member and the suspended glass sheet from said lowermost one of said treatment stations to a higher one of the treatment stations, lifting a further glass sheet from the furnace to said lowermost one of the treatment stations by lifting a transport member from which said further glass sheet is suspended, and commencing processing of said further glass sheet at said lowermost one of the said treatment stations while subsequent processing of the glass sheet is carried out at said higher one of the treatment stations.

12. Apparatus for the production of curved and toughened glass sheets, comprising:
a furnace for heating the glass sheets;
a plurality of transport members from each of which transport members a glass sheet is suspended vertically in the furnace;
a bending station including horizontally acting bending dies located immediately above the furnace;
a quenching station including opposed air blowing frames located above the bending station;
a horizontal trackway on which said transport members run as they convey the glass sheets horizontally through the furnace from a loading end to a position beneath the bending station;
a conveyor trackway extending from the quenching station to a furnace loading hoist positioned above the loading end of the furnace;
a lifting device associated with said bending and quenching stations and including means for engaging below one of said transport members and lifting that transport member and a heated glass sheet suspended therefrom vertically from the furnace to the bending station and then to the quenching station; and
means associated with said conveyor trackway at the quenching station for supporting the transport member and the glass sheet suspended therefrom at the quenching station independently of the lifting device so that the lifting device can then be lowered to engage below the transport member of the next glass sheet suspended in the furnace for the commencement of the lifting of the next glass sheet from the furnace to the bending station while the first-mentioned glass sheet is being quenched at the quenching station.

13. Apparatus for the processing of glass sheets comprising:
a furnace for heating the glass sheets;
a plurality of transport members each adapted for suspending a glass sheet vertically in the furnace;
a trackway associated with the furnace on which said transport members run;
a series of treatment stations for the heated glass sheets positioned vertically one above the other over the furnace;
a lifting device associated with said treatment stations and including means for engaging below one of said transport members on the trackway and lifting that transport member vertically from the trackway to bring the heated glass sheet suspended therefrom into one, at least the lowermost, of said treatment stations; and
means above said one of the treatment stations for subsequently supporting the transport member and the suspended glass sheet independently of the lifting device so that the lifting device can then be lowered to engage below the next transport member on the trackway for lifting the heated glass sheet suspended therefrom to said one of the treatment stations while subsequent processing of the preceding, and now independently supported, glass sheet is carried out.

14. A method for curving and toughening a glass sheet comprising the steps of:
suspending a glass sheet from a transport member in a furnace;
heating the glass sheet in the furnace to a temperature suitable for further processing;
lifting the transport member with the suspended glass sheet from below vertically from the furnace into a bending station located immediately above the furnace;
bending the glass sheet to a desired curvature at the bending station;
then lifting the curved glass sheet vertically to a quenching station located above the bending station;
independently supporting the transport member and the curved glass sheet at the quenching station while the glass sheet is toughened; and while said glass sheet is being toughened at the quenching station lifting a further glass sheet from the furnace to the bending station by lifting from below the transport member from which said further glass sheet is suspended.

* * * * *